United States Patent
Ryshavy et al.

(10) Patent No.: US 8,317,210 B1
(45) Date of Patent: Nov. 27, 2012

(54) SUSPENSION HEIGHT ADJUSTMENT APPARATUS

(75) Inventors: John W. Ryshavy, Wayzata, MN (US); James R. Ryshavy, Eden Prairie, MN (US)

(73) Assignee: Stempf Automotive Industries, Inc., Minnetonka, MN (US)

( * ) Notice: Subject to any disclaimer, the term of this patent is extended or adjusted under 35 U.S.C. 154(b) by 208 days.

(21) Appl. No.: 12/915,639

(22) Filed: Oct. 29, 2010

(51) Int. Cl.
*B60G 15/00* (2006.01)

(52) U.S. Cl. ....... 280/124.147; 280/124.155; 280/124.1; 280/6.157

(58) Field of Classification Search ............... 280/124.1, 280/124.147, 124.155, 6.157; 267/220, 221
See application file for complete search history.

(56) References Cited

U.S. PATENT DOCUMENTS

| | | | |
|---|---|---|---|
| 3,586,306 A | | 6/1971 | Reece et al. |
| 4,458,605 A | | 7/1984 | Herring, Jr. et al. |
| 4,647,069 A | | 3/1987 | Iijima |
| 4,721,325 A | | 1/1988 | Mackovjak et al. |
| 5,080,388 A | | 1/1992 | Berry et al. |
| 5,135,203 A | | 8/1992 | Wijnhoven et al. |
| 5,467,971 A | * | 11/1995 | Hurtubise et al. ............ 267/220 |
| 5,470,049 A | * | 11/1995 | Wohler et al. ................. 267/172 |
| 5,788,262 A | * | 8/1998 | Dazy et al. ............. 280/124.155 |
| 5,967,536 A | | 10/1999 | Spivey et al. |
| 6,161,822 A | | 12/2000 | Hurst et al. |
| 6,257,601 B1 | * | 7/2001 | Spears et al. ............. 280/86.752 |
| 6,260,835 B1 | | 7/2001 | Angles et al. |
| 6,273,407 B1 | * | 8/2001 | Germano ...................... 267/221 |
| 6,293,572 B1 | | 9/2001 | Robbins et al. |
| 6,328,321 B1 | | 12/2001 | Nolan |
| 6,382,645 B1 | | 5/2002 | Gravelle et al. |
| 6,485,223 B1 | * | 11/2002 | Van Schmus et al. ..... 403/408.1 |
| 6,820,883 B2 | * | 11/2004 | Lang et al. ............. 280/124.157 |
| 6,827,184 B1 | | 12/2004 | Lin |
| 6,843,352 B2 | | 1/2005 | Jacoby et al. |
| 6,923,461 B2 | | 8/2005 | Momose et al. |
| 6,954,257 B2 | | 10/2005 | Kurt et al. |
| 6,957,806 B2 | | 10/2005 | Tubbs |
| 6,986,519 B2 | | 1/2006 | Smith |
| 7,066,309 B2 | * | 6/2006 | Colas et al. ............. 188/321.11 |
| 7,284,644 B2 | | 10/2007 | Cmich et al. |
| 7,311,181 B2 | * | 12/2007 | Germano et al. ........ 188/321.11 |
| 7,537,225 B2 | * | 5/2009 | Ryshavy et al. ....... 280/124.155 |
| 7,607,668 B2 | * | 10/2009 | Dugandzic et al. ...... 280/86.752 |
| 7,665,743 B2 | | 2/2010 | Poncher et al. |
| 7,780,178 B2 | * | 8/2010 | Ryshavy et al. ....... 280/124.147 |
| 7,850,183 B1 | * | 12/2010 | Ryshavy et al. ....... 280/124.147 |
| 7,976,039 B2 | * | 7/2011 | Hirve et al. ............ 280/124.145 |
| 8,109,492 B2 | * | 2/2012 | Winocur ....................... 267/220 |
| 2004/0089990 A1 | | 5/2004 | Labeau |
| 2012/0098215 A1 | * | 4/2012 | Rositch et al. ............. 280/6.157 |

OTHER PUBLICATIONS

Topguncustomz.com website, All Steel Leveling Spacers, pp. 1-2.

* cited by examiner

*Primary Examiner* — Toan To
*Assistant Examiner* — James English
(74) *Attorney, Agent, or Firm* — Haugen Law Firm PLLP

(57) ABSTRACT

A suspension height adjustment apparatus includes first and second plates which may cooperatively engage to define a plurality of thickness dimensions, which correspond to suspension height adjustment dimensions. The first and second plates of the suspension height adjustment apparatus may be coupled between an upper strut assembly and a vehicle frame through a plurality of connection adapters which engage to the upper strut studs of the strut assembly.

10 Claims, 5 Drawing Sheets

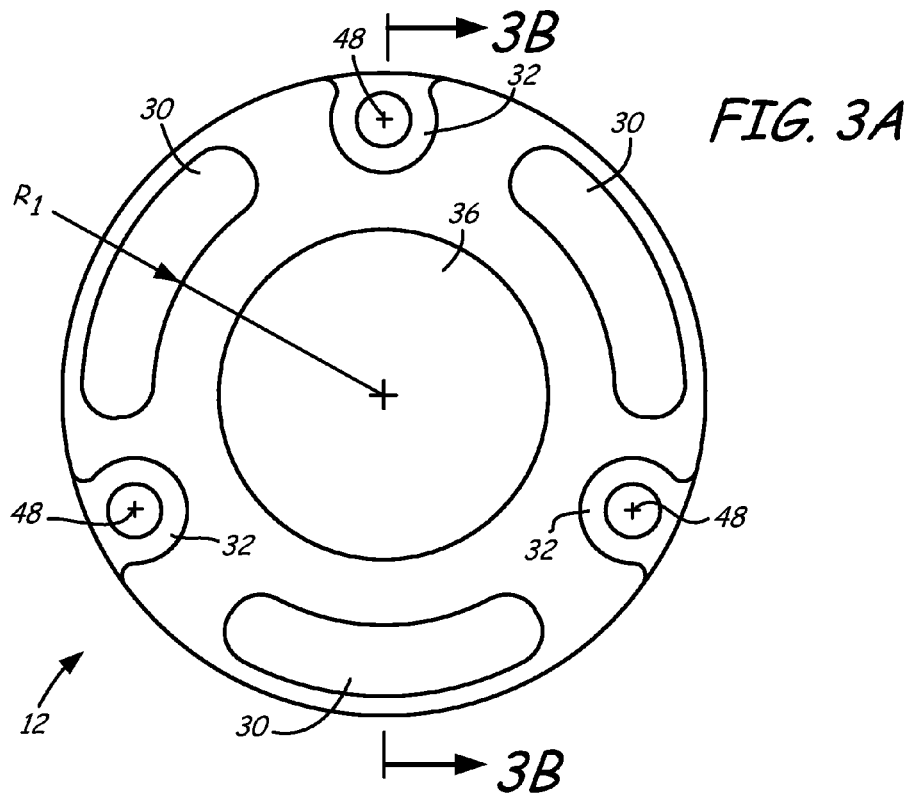

US 8,317,210 B1

SUSPENSION HEIGHT ADJUSTMENT APPARATUS

FIELD OF THE INVENTION

The present invention relates to automotive suspension systems generally, and more particularly to apparatus and methods for adjusting automotive suspension height.

BACKGROUND OF THE INVENTION

Automotive suspension systems in use today incorporate a variety of arrangements to best suit the intended applications. An automotive suspension apparatus that has become popular is a strut assembly, which typically involves a coil spring mounted over a shock-absorbing piston. The coil spring and shock absorber are mounted in a strut assembly between upper and lower strut housings. Such strut assemblies are positioned to extend between the wheel assemblies and the vehicle frame, so as to insulate movement of the wheel assembly from the vehicle frame.

In some instances, vehicle owners wish to modify the height of the vehicle frame with respect to its wheels. For example, certain vehicles, such as light-duty trucks, are originally equipped with a suspension that elevates the rear of the vehicle to a greater extent than the front, so as to accommodate for a level vehicle upon loads being placed at the rear end of the vehicle. In such arrangements, some vehicle owners wish to "pre-level" the suspension by raising the front of the vehicle frame to match the extent of vehicle lift provided by the manufacturer at the rear. Such raising of the front suspension of a vehicle is commonly referred to as "suspension leveling". Other applications for raising the suspension height of a vehicle include vehicle owners who simply wish to raise the height of the vehicle frame relative to the wheels for ground clearance, wheel-clearance, or aesthetic purposes.

Devices for effectuating such suspension height modification include static spacers of fixed dimension that are typically placed between the top of the strut assembly and the vehicle frame at the point of connection therebetween. Other suspension height increasing solutions involve fixed dimension spacers disposed between individual coils of the coil spring component of the strut assembly. In either case, the extent of the suspension height increase is predetermined by the dimension of the static space utilized. In many instances, the effect on vehicle ride quality due to suspension height extension is unpredictable. As a result, suspension height modifications are many times repeated in order to achieve a desired balance between suspension height and vehicle ride quality. As a result, a need exists in the art for a suspension height adjustment apparatus that enables a range, and not just a single dimension, of suspension height modification.

It is therefore an object of the present invention to provide a suspension adjustment apparatus that facilitates a range of suspension height modification in a simple and inexpensive device.

SUMMARY OF THE INVENTION

By means of the present invention, suspension height of a vehicle may be selectively modified, wherein an extent of suspension height increase may be selected in an efficient manner with a single adjustment apparatus. In a particular embodiment, the suspension adjustment apparatus of the present invention includes first and second plates which may be used individually or in combination between the vehicular strut assembly and the vehicular frame in various orientations to selectively adjust the suspension height of the vehicle. The apparatus utilizes a plurality of connection adaptors which facilitate securement of the suspensions adjustment apparatus between the strut assembly and the vehicle frame. The components of the suspension adjustment apparatus are configured to selectively matingly engage with one another to establish a desired spacing dimension of the apparatus.

BRIEF DESCRIPTION OF THE DRAWINGS

FIG. 3A is an isolation top view of a portion of the suspension height adjustment apparatus illustrated in FIG. 2;

FIG. 3B is a cross-sectional side view of the portion of the suspension height adjustment apparatus illustrated in FIG. 3A as taken along cut line 3B-3B;

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures, which are intended to be representative of various embodiments of the invention. Other embodiments and aspects of the invention are recognized as being within the grasp of those having ordinary skill in the art.

Figure 1:
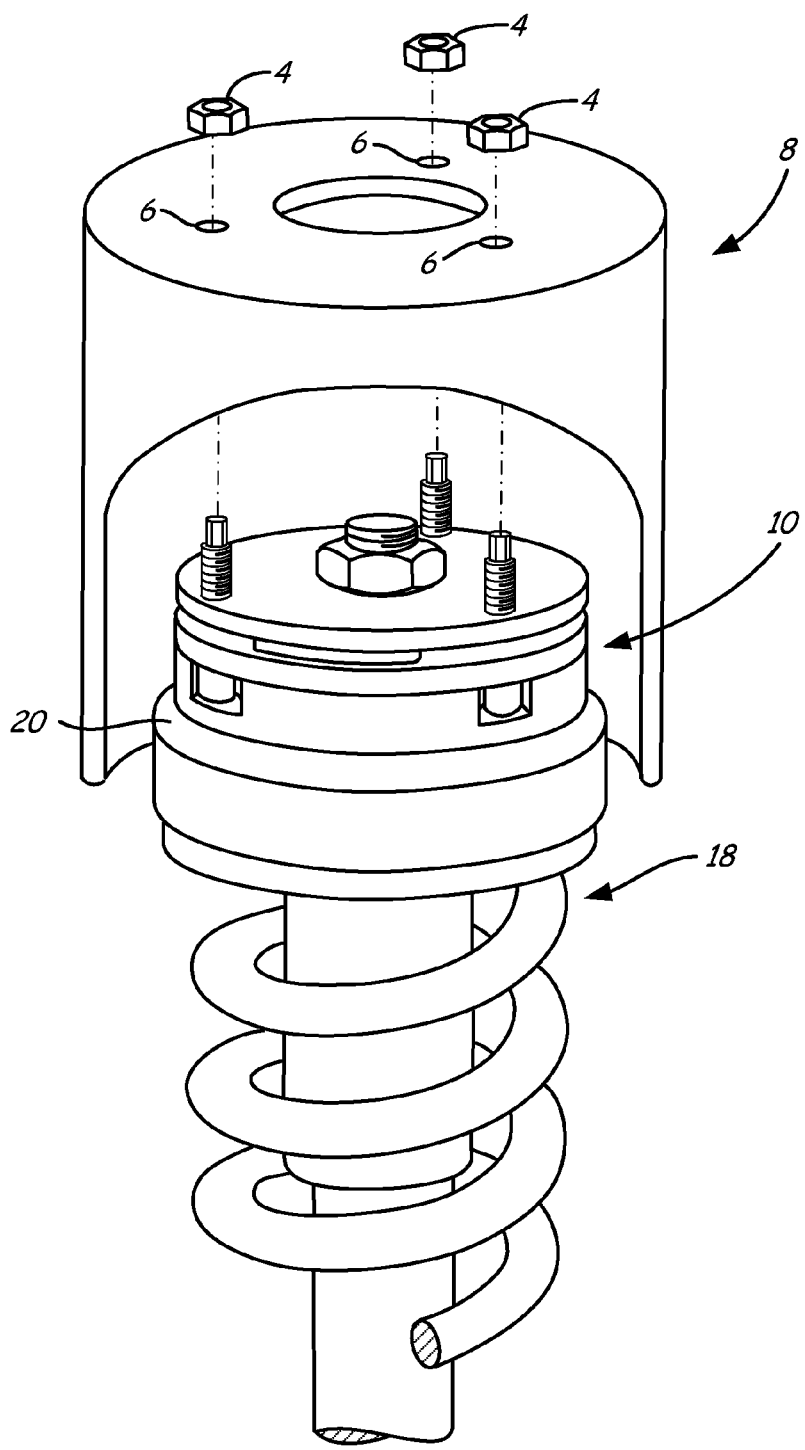
FIG. 1 is a schematic view of a suspension height adjustment apparatus of the present invention.
Figure 2:
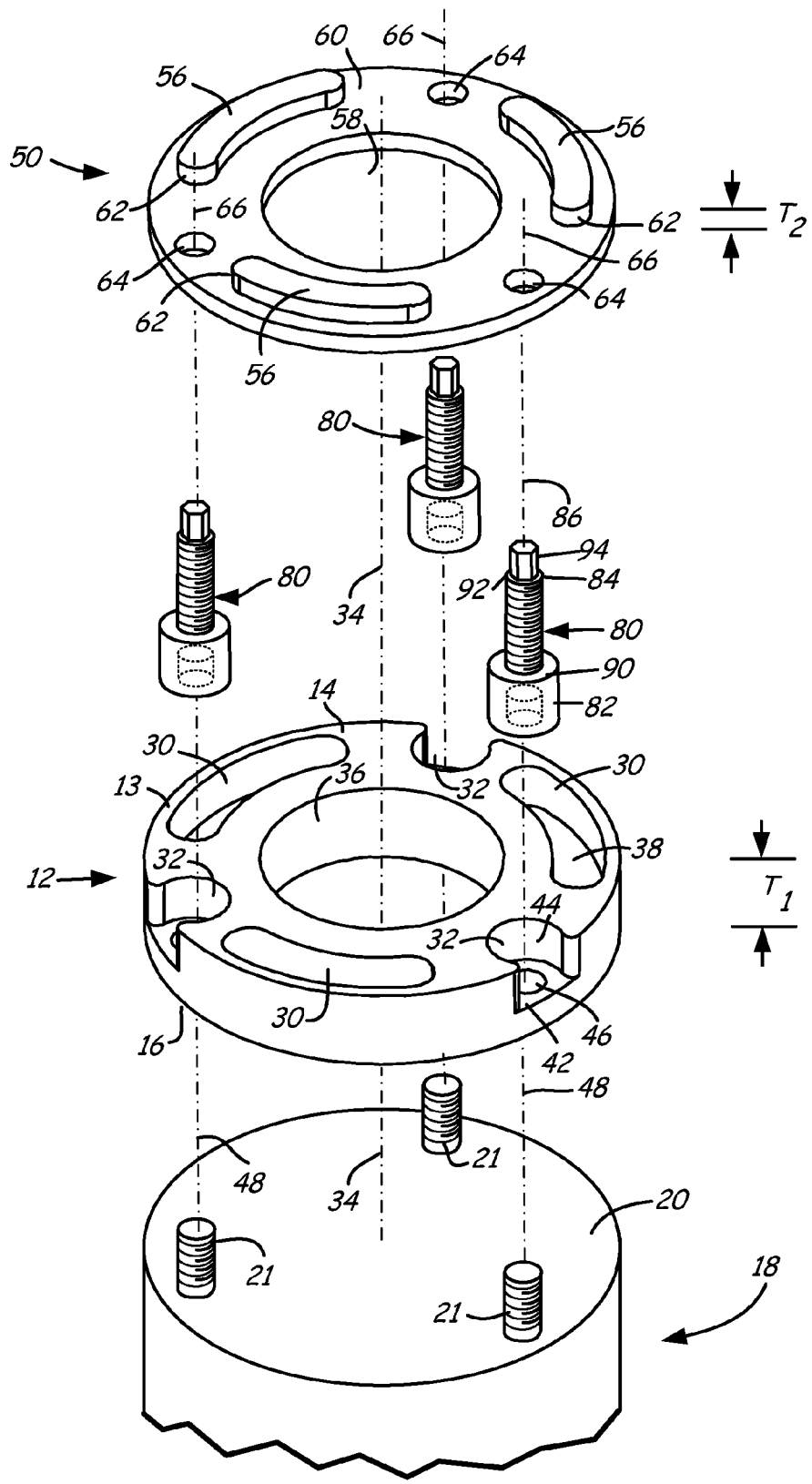
FIG. 2 is an exploded perspective view of a suspension adjustment apparatus of the present invention.
Figure 4A:
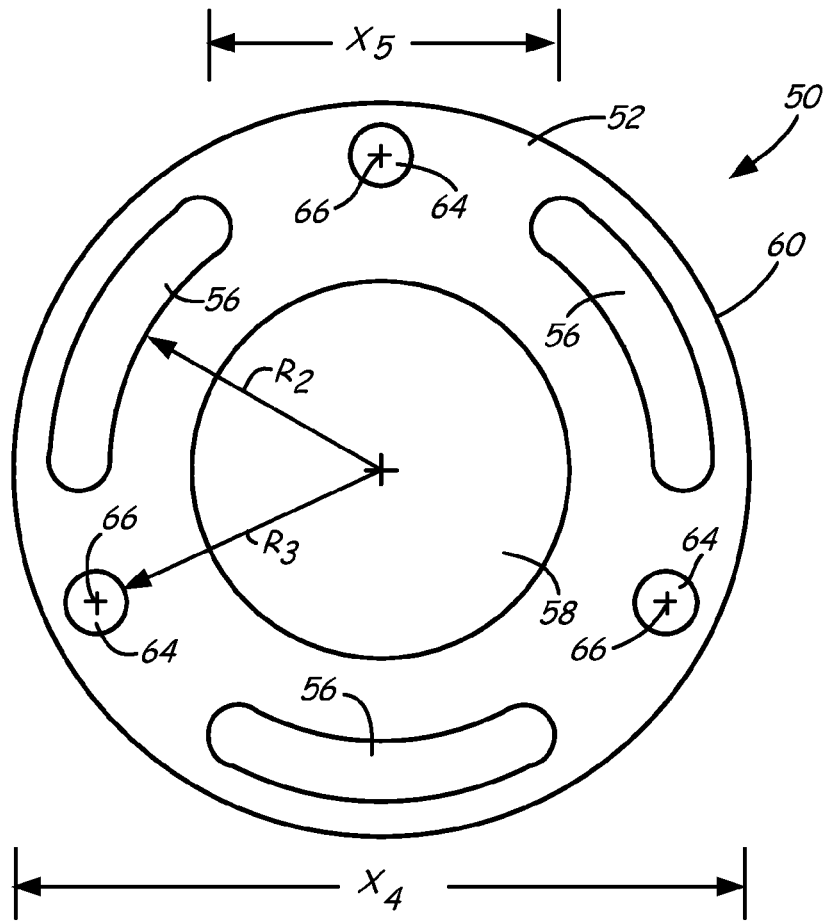
FIG. 4A is an isolation top view of a portion of the suspension height adjustment apparatus illustrated in FIG. 2.
Figure 4B:
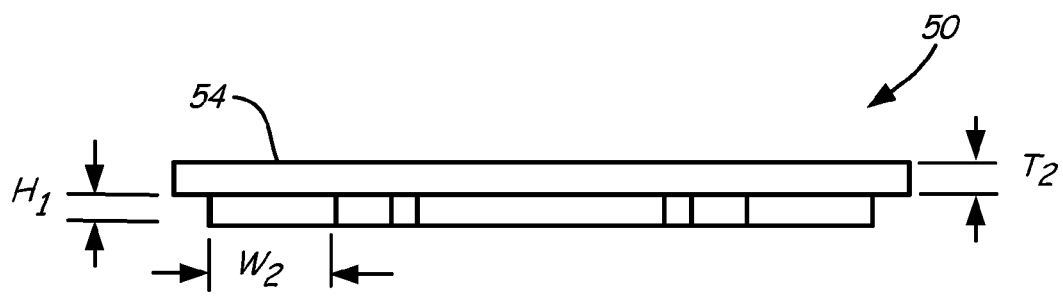
FIG. 4B is a side elevational view of the portion of the suspension height adjustment apparatus illustrated in FIG. 4A.
Figure 5A:
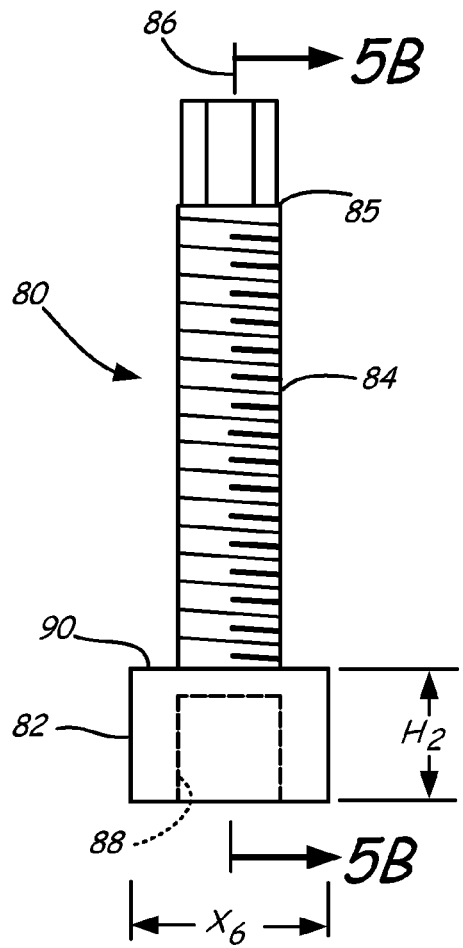
FIG. 5A is a side elevational view of the portion of the suspension height adjustment apparatus illustrated in FIG. 2.
Figure 5B:
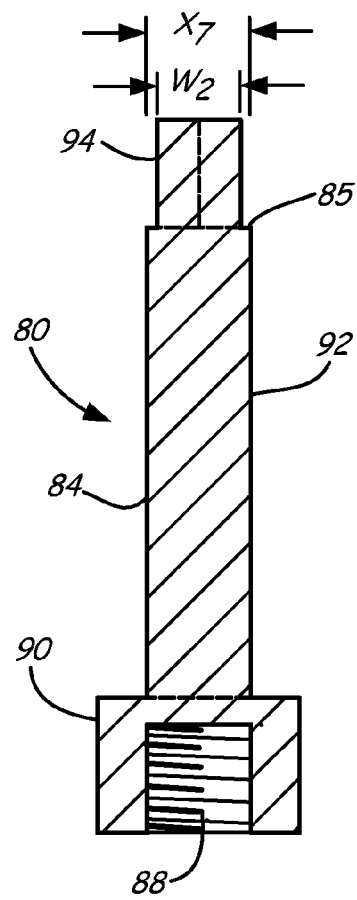
FIG. 5B is a cross-sectional view of the portion of the suspension height adjustment apparatus illustrated in FIG. 5A as taken along cut line 5B-5B.

With reference now to the drawing figures, and first to FIG. 1, a suspension adjustment apparatus 10 is illustrated in an arrangement mounted to an upper end 20 of strut assembly 18. Through such an orientation, apparatus 10 may act as a spacer between upper end 18 of strut assembly 20 and the associated vehicle frame 8.

Suspension adjustment apparatus 10 includes a first plate 12 having first and second generally opposed sides 14, 16 defining a first thickness dimension "$T_1$" therebetween. First side 14 of first plate 12 may include a plurality of first recesses 30 and a plurality of second recesses 32 circumaxially disposed therein about a first axis 34, which is oriented substantially perpendicularly to first and second sides, 14, 16 of first plate 12. First recesses 30 may be circumaxially spaced apart substantially along a periphery 13 of first plate 12, and in some embodiments may be equidistantly spaced apart thereabout. In the illustrated embodiment, first plate 12 includes a first central opening 36 about which first recesses may be disposed. The example configuration of first recesses 30 in the illustrated embodiment are curvilinearly shaped with substantially planar base portions 38 parallel to first and second sides 14, 16, and a side wall 40 substantially perpendicularly extending from and about base portion 38. In one embodiment, first recesses 30 may have a depth dimension "$D_1$" of about 0.5 inches along a curvilinear shape which may itself be circumaxial about first axis 34. It is to be understood, however, that first recesses 30 may be provided in a variety of arrangements and configurations in first plate 12, and that the illustrated configurations are exemplary only.

In one embodiment, first plate 12 may have a first thickness dimension $T_1$ of between about 0.75 and about 1 inch, and a diameter dimension "$X_1$" of between about 4.5 and 5 inches. Central opening 36 may be a through-bore through thickness dimension $T_1$, and may have a diameter "$X_2$" of about 2.5 inches. Other dimensions and configurations for first plate 12, however, are contemplated as being useful in the present invention.

Second recesses 32 may be disposed circumaxially about first axis 34 in first side 14 and, in the illustrated embodiment, may be dispersed about first side 14 so as to be circumaxially interposed between respective adjacent pair of first recesses 30. Second recesses 32 may have a depth dimension "$D_2$" of about 0.5 inches as measured between first side 14 and base portion 42 of second recesses 32. Side wall 44 of second recesses 32 may extend between first side 14 and base portion 42, and may be substantially semi-cylindrical with a diameter dimension "$X_3$" of about 0.8 inches. Other configurations, however, for second recesses 32 are also contemplated as being useful in the present invention.

In one embodiment, the plurality of second recesses 32 forms a set of three recesses, which number of recesses may correspond to the number of upper strut studs 21 provided at upper end 20 of strut assembly 18. To accommodate such strut assembly studs 21, second recesses 32 may each include apertures 46 which are defined about respective aperture axes 48, with the aperture axes 48 being substantially parallel to first axis 34. Apertures 46 may be configured to receive upper strut studs 21 therethrough.

Apparatus 10 further includes a second plate 50 having a first side 52 and a second generally opposed second side 54 defining a second thickness dimension "$T_2$" therebetween. In the illustrated embodiment, second thickness dimension $T_2$ may be about 0.2 inches, though other dimensions are contemplated as being useful in the present invention. A plurality of bosses 56 extend from first side 52 of second plate 50, and are specifically configured and arranged to matingly engage with respective ones of first recesses 30 in first plate 12. The mating engagement between bosses 56 and first recesses 30 may operably inhibit relative circumaxial rotation between first and second plates 12, 50. Therefore, at least one of bosses 56 engages with a respective one of first recesses 30 to inhibit relative circumaxial rotation as between first and second plates 12, 50. In the illustrated embodiment, each of bosses 56 are so arranged and configured to matingly engage with respective ones of first recesses 30.

In the illustrated embodiment, bosses 56 may be spaced apart and curvilinearly configured and arranged circumaxially about first axis 34, and further about central opening 58 in second plate 50. In this embodiment, bosses 56 may be arranged cooperatively with first recesses 30, so as to be similarly circumaxially and radially spaced from first axis 34. Accordingly, bosses 56 may be equally or inequally radially spaced from first axis 34, and may be equally or inequally circumaxially spaced about or adjacent to periphery 60 of second plate 50, in like manner to the spacing of first recesses 30 relative to first plate 12. In the illustrated embodiment, each of bosses 56 may be substantially equally circumaxially spaced about first axis 34 and adjacent and along periphery 60. Moreover, bosses 56 may be radially spaced from first axis 34 by a dimension "$R_2$" of about 1.8 inches. The radial spacing of first recesses 30 from first axis 34 may be a similar, but slightly smaller dimension "$R_1$" of about 1.75 inches.

Moreover, a width dimension "$W_2$" of bosses 56 may be slightly smaller than width dimension $W_1$ of first recesses 30, such as about 0.4 inches, such that boss 56 may be received in a respective first recess 30. Bosses 56 may have a height dimension "$H_1$" of about 0.2 inches, but may be larger or smaller as deemed appropriate for the application.

To best cooperate with first recesses 30, side walls 62 of bosses 56 may extend substantially perpendicularly from first side 52, wherein side walls 62 may be in operable juxtaposition with side walls 40 of respective first recesses 30 to inhibit relative circumaxial rotation between first and second plates 12, 50. It is to be understood, however, that bosses 56 may be similarly or dissimilarly configured with respect to one another, and may be provided in a variety of configurations for reception in first recesses 30.

Second plate 50 further includes a plurality of apertures 64 extending through second thickness dimension $T_2$ along respective aperture axes 66 that are substantially parallel to first axis 34, and may be axially alignable with respective aperture axes 48 in first plate 12. Accordingly, apertures 64 may be similarly arranged and configured at second plate 50 in comparison to apertures 46 in first plate 12. In the illustrated embodiment, apertures 64 may be substantially equally circumaxially spaced about first axis 34, and may be radially spaced from first axis 34 by a radial dimension $R_3$ of about 2 inches. In some embodiments, second plate 50 may have a diameter dimension $X_4$ substantially similar to the diameter dimension $X_1$ of first plate 12, such as between about 4.5 and 5 inches. Moreover, center opening 58 of second plate 50 may be substantially similar to opening 36 in first plate 12, and may therefore have a diameter dimension $X_5$ of about 2.5 inches.

Apparatus 10 may further include a plurality of connection adaptors 80 each having a base portion 82 and an extension portion 84 extending from base portion 82 along an adaptor axis 86. Base portions 82 of connection adaptors 80 include a base recess 88 defined about adaptor axis 86, with base recess 88 being configured to engage with upper strut studs 21. In one embodiment, base recess 88 may be threaded to operably threadably engage with upper strut studs 21.

In the illustrated embodiment, base portions 82 are configured to matingly engage with respective ones of second recesses 32 in an orientation such that apertures 46 operably align with the respective adaptor axis 86 of connection adaptors 80. For example, aperture axes 48 may axially align with respective adaptor axes 86 when base portion 82 is matingly received in a respective one of second recesses 32. In one embodiment therefore, base portion 82 may be correspondingly configured to second recess 32 so as to cooperatively engage therein. Base portion 82 may have a diameter dimension "$X_6$" that is substantially similar to, but slightly smaller than, the diameter dimension $X_3$ of second recess 32. In one example, diameter dimension $X_3$ of second recesses 32 is about 0.8 inches, while the diameter dimension $X_6$ of base portion 82 is about 0.75 inches. Through such relative configurations, sidewall 90 of base portion 82 may be placed in operable juxtaposition with sidewall 44 of second recesses 32 to at least partially retain connection adaptors 80 within respective second recesses 32. While base portion 82 is illustrated with a substantially cylindrical configuration to engage in substantially cylindrical second recess 32, it is contemplated that a variety of relative configurations for base portion 82 and second recess 32 may be employed in the present invention.

So that second plate 50 is capable of being placed in contact with first plate 12 upon assembly of apparatus 10, base portions 82 may have a height dimension "$H_2$" of less than or equal to depth dimension $D_2$ of second recesses 32. In one embodiment, height dimension $H_2$ of base portions 82 are substantially similar to depth dimension $D_2$ of second recesses 32, and may be about 0.5 inches.

Extension portions 84 of connection adaptors 80 may be configured to be receivable in and through second plate apertures 64. In this manner, second plate 50 may be coupled to first plate 12 through the reception of extension portions 84 through respective apertures 64. As described above, apertures 64 in second plate 50 are arranged and configured to be axially alignable with apertures 46 in first plate 12, such that aperture axes 48, adaptor axes 86, and aperture axes 66 may axially align in the assembly of second plate 50 to first plate 12. It is to be understood that second plate 50 may be assembled to first plate 12 in a first orientation with first side 52 of second plate 50 being in facing relationship with first side 14 of first plate 12, and with bosses 56 engaged within first recesses 30, and a second orientation in which second side 54 of second plate 50 is in facing relationship with first side 14 of first plate 12. In addition, it is contemplated that apparatus 10 may be used as a spacer device at upper end 20 of strut assembly 18 without second plate 50, such that only first plate 12 acts as a spacer interposed between upper end 20 of strut assembly 18 and vehicle frame 8. To facilitate engagement of apparatus 10 to frame 8, extension portions 84 of connection adaptors 80 may be configured to be operably received in and through frame apertures 6 of frame 8. Moreover, side wall 92 of extension portions 84 may be threaded so as to threadably engage a nut 4 to secure extension portion 84 to vehicle frame 8.

Connection adaptors 80 may further include an engagement feature 94 at a distal end 85 of extension portion 84. In one embodiment, engagement feature 94 is a six-sided head portion to facilitate coupling thereto by a hex-head wrench or the like. In such a manner, a tool, such as a wrench, may efficiently grasp connection adaptors 80 to, for example, threadably engage base recess 88 to upper strut studs 21. In one embodiment of the invention, engagement feature 94 may have a width dimension "$W_3$" that is smaller than a diameter dimension "$X_7$" of extension portion 84. In such a manner, engagement feature 94 is sized and configured to be received in and through apertures 64 in second plate 50 and frame apertures 6. Once so positioned, a nut 4 may pass over engagement feature 94 to threadably engage with extension portion 84 to secure connection adaptor 80 to frame 8. Through the coupling of upper strut studs 21 to connection adaptors 80 through apertures 46 in first plate 12, and through the reception of extension portions 84 through apertures 64 in second plate 50, apparatus 10 may be secured between upper end 20 of strut assembly 18 and vehicle frame 8.

To mount apparatus 10 between strut assembly 18 and frame 8, apertures 46 of first plate 12 are positioned to receive upper strut studs 21 of strut assembly 18 therethrough. Upper strut studs 21 may then be secured within base recesses 88 of respective ones of connection adaptors 80, and in one embodiment by threadably securing connection adaptors 80 to upper strut studs 21 by rotatably actuating connection adaptors 80 at respective engagement features 94. Apparatus 10 may be utilized with first plate 12 individually, such that a spacing adjustment dimension is substantially equivalent to first thickness dimension $T_1$. In other embodiments, however, a larger suspension adjustment dimension is desired, such that second plate 50 may be included by receiving extension portions 84 of connection adaptors 80 within and through respective ones of apertures 64 of second plate 50. When second plate 50 is mounted to first plate 12 in an orientation with first side 52 in facing relationship with first side 14 of first plate 12, bosses 56 may be received in and matingly engaged with respective ones of first recesses 30. In such an arrangement, the suspension adjustment dimension is substantially equivalent to the sum of first and second thicknesses $T_1$ and $T_2$.

A still larger suspension adjustment dimension is available through apparatus 10 by orienting second plate 50 with second side 54 in facing relationship with first side 14 of first plate 12. In this arrangement, suspension adjustment dimension provided by apparatus 10 is substantially equivalent to the sum of first and second thickness dimensions $T_1$ and $T_2$, and height dimension $H_1$ of bosses 56. In this arrangement, bosses 56 bear against vehicle frame 8.

It is to be understood that the components of apparatus 10 described herein may preferably be fabricated from durable and strong materials for best performance. Overall, the invention has been described herein in considerable detail in order to comply with the patent statutes, and to provide those skilled in the art with the information needed to apply the novel principles and to construct and use embodiments of the invention as required. However, it is to be understood that the invention may be carried out by different methods/devices, and that various modifications may be accomplished without departing from the scope of the invention itself.

What is claimed is:

1. A suspension height adjustment apparatus, comprising:
    a first plate having first and second generally opposed sides defining a first thickness dimension therebetween, said first side including a first set of a plurality of first recesses and a second set of a plurality of second recesses circumaxially disposed therein about a first axis oriented substantially perpendicularly to said first and second sides, said second recesses including apertures defined about respective aperture axes which are substantially parallel to said first axis, said apertures being configured to operably receive upper strut studs therethrough;
    a second plate having first and second generally opposed sides defining a second thickness dimension therebetween, said first side including a plurality of bosses extending therefrom, wherein said bosses are specifically configured and arranged to matingly engage with respective ones of said first set of said first recesses to operably inhibit relative circumaxial rotation of said first and second plates, said second plate further including a plurality of apertures extending through said second thickness dimension along respective axes that are substantially parallel to said first axis, said apertures in said second plate being arranged to be axially alignable with said apertures in said first plate; and
    a plurality of connection adaptors each having a base portion and an extension portion extending from said base portion along an adaptor axis, with said base portion including a base recess defined about said adaptor axis and said base portion being configured to matingly engage with respective ones of said second set of second recesses in an orientation such that said aperture in said second recess operably aligns with said adaptor axis, said extension portion being receivable in said second plate apertures.

2. A suspension height adjustment apparatus as in claim 1 wherein said second plate apertures are arranged to axially align with said first plate apertures when said bosses are matingly engaged with said first recesses.

3. A suspension height adjustment apparatus as in claim 1 wherein said base recesses are threaded to operably threadably engage with the upper strut studs.

4. A suspension height adjustment apparatus as in claim 1 wherein said extension portions are threaded.

5. A suspension height adjustment apparatus as in claim 1, including an engagement feature at a distal end of said extension portion.

6. A suspension height adjustment apparatus as in claim 5 wherein said engagement feature is a six-sided head portion.

7. A method for adjusting suspension height in a vehicle, said method comprising:
(a) providing a suspension height adjustment apparatus having:
  (i) a first plate having first and second generally opposed sides defining a first thickness dimension therebetween, said first side including a first set of a plurality of first recesses and a second set of a plurality of second recesses circumaxially disposed therein about a first axis oriented substantially perpendicularly to said first and second sides, said second recesses including apertures defined about respective aperture axes which are substantially parallel to said first axis;
  (ii) a second plate having first and second generally opposed sides defining a second thickness dimension therebetween, said first side including a plurality of bosses extending therefrom, wherein said bosses are specifically configured and arranged to matingly engage with respective ones of said first set of said first recesses to operably inhibit relative circumaxial rotation of said first and second plates, said second plate further including a plurality of apertures extending through said second thickness dimension along respective axes that are substantially parallel to said first axis;
  (iii) a plurality of connection adapters each having a base portion and an extension portion extending from said base portion along an adaptor axis, with said base portion including a base recess defined about said adaptor axis, and said base portion being configured to matingly engage with respective ones of said second set of second recesses;
(b) mounting said first plate to an upper portion of a strut assembly by receiving upper strut studs of said strut assembly though said first plate apertures;
(c) securing the upper strut studs within said base recesses of respective ones of said connection adaptors; and
(d) securing said extension portions of said connection adaptors to a frame of said vehicle.

8. A method as in claim 7, including mounting said second plate between said first plate and the vehicle frame by receiving said extension portions of said connection adaptors through respective ones of said second plate apertures.

9. A method as in claim 8, including mounting said first side of said second plate in facing relationship with said first side of said first plate such that said bosses matingly engage with respective ones of said first recesses in said first plate.

10. A method as in claim 7, including positioning said base portions of said connection adaptors in respective ones of said second recesses in said first plate.

\* \* \* \* \*